United States Patent

[11] 3,619,038

| [72] | Inventors | Robert E. Underhill;<br>Roy D. Strengholt; Konrad H. Marcus, all of Holland, Mich. |
|---|---|---|
| [21] | Appl. No. | 666,793 |
| [22] | Filed | Sept. 11, 1967 |
| [45] | Patented | Nov. 9, 1971 |
| [73] | Assignee | Donnelly Mirrors, Inc.<br>Holland, Mich.<br>by said Underhill |

[54] DAY/NIGHT PRISM REARVIEW MIRROR
4 Claims, 7 Drawing Figs.

[52] U.S. Cl. .................................. 350/281, 156/500
[51] Int. Cl. .................................. G02b 5/08, G02b 17/00
[50] Field of Search .................................. 350/278-282

[56] References Cited
UNITED STATES PATENTS

| 3,467,465 | 9/1969 | Van Noord | 350/281 |
| 2,087,531 | 7/1937 | Sands | 350/282 |
| 3,427,095 | 2/1969 | Dykema et al. | 350/281 X |
| 3,427,096 | 2/1969 | Dykema et al. | 350/281 X |

Primary Examiner—John K. Corbin
Attorney—Price, Heneveld, Huizenga & Cooper

ABSTRACT: This disclosure relates to a glass mirror assembly, such as for example, a rearview mirror for an automobile. The mirror is produced by heating a reflective glass plate, and placing the heated glass plate in a mold slightly larger than the plate, and having a ditch around the edge of the mold. The reflective glass plate is held in place in the mold by a vacuum source, which communicates with the glass plate through vacuum ports in the mold wall. A mirror bracket or support, preferably containing a prism actuator element, is secured in the opposite side of the mold cavity. The mold-halves are closed, and the actuator element is pressed against the back of the mirror by a special brace which extends through the mold-half to secure the position of the mirror glass in the mold. The brace is tightened after the mold-halves are closed. The heated thermoplastic material, such as polyvinyl chloride, is injected into the mold under pressure to form a supporting body of the assembly. The bracket or actuator element has a flat surface which is coated with a thermoplastic material, preferably the same which is injected into the mold, and this coated surface contacts the mirror glass. The thermoplastic material is bonded to the mirror glass plate, preferably through an adhesive-promoting coating on the mirror plate.

PATENTED NOV 9 1971 3,619,038

INVENTORS.
ROBERT E. UNDERHILL
ROY D. STRENGHOLT
KONRAD H. MARCUS

BY *(signature)*

ATTORNEYS

INVENTORS.
ROBERT E. UNDERHILL
ROY D. STRENGHOLT
KONRAD H. MARCUS

BY

ATTORNEYS

DAY/NIGHT PRISM REARVIEW MIRROR

This invention relates to rearview mirrors. In one of its aspects, it relates to a rearview mirror assembly in which a reflective glass plate has adhesively bonded to the back thereof a solid, flexible, thermoplastic-backing body of such composition and thickness that in the event the glass plate is broken under impact, the backing body will yield and bend, but will not break or tear, even at low temperatures, and in which an assembly-supporting element having a flat surface is positioned firmly against the reflective glass plate, said flat surface being securely bonded to said reflective glass plate through a layer of thermoplastic material.

In another of its aspects, the invention relates to a method for making a rearview mirror assembly in which a glass plate having a reflective coating thereon, is coated with an adhesion-promoting material, is heated to an elevated temperature, the heated glass plate is placed in a molding zone which has the same general shape as the mirror only slightly larger, and which zone has a platform surrounded by a peripheral ditch, on which platform the heated glass plate is placed, a vacuum is drawn on the side of the plate in contact with the platform to hold the plate in place, a bracket is placed against the mirror plate and forced against said mirror plate with such force as to securely hold the mirror plate in place, and molten thermoplastic material is introduced into the mold to form the backing material, and the backing material is securely adhesively bonded to the glass mirror plate.

In another of its aspects the invention relates to an apparatus for producing a rearview mirror assembly, the apparatus comprising a molding means having a first mold-half containing a shallow, elongated cavity with a peripheral area deeper than the central portion, the central portion being relatively flat, vacuum-drawing means in the central area to hold the glass plate positioned in the central area, a second mold containing a shallow mold cavity which, when united with the mold cavity in the first mold-half, will form a complete unit, an aperture in one side of the mold cavity extending through the side of the mold-half, means within the aperture for holding a support unit in the second mold-half in the vicinity of, but spaced from, the sides of the mold cavity, means extending through the second mold cavity for forcing the support unit firmly against the glass plate when the mold units are closed and means to inject heated thermoplastic material under pressure into the mold cavity.

In copending coassigned Ser. No. 252,751, filed Jan. 21,1963, now abandoned, there is disclosed and claimed a rearview mirror assembly in which a reflective glass plate has bonded thereto a resinous backing layer. The thickness and the composition of the coating are such that if the glass is broken under impact, the backing material will have sufficient flexibility and strength to bend without breaking or tearing. The adhesion of the glass to the backing material is such that if the glass is broken it will adhere to the backing material. A mounting bracket can be mounted in the resin-backing material. The safety features of the assembly are pointed out in said application, Ser. No. 252,751.

I have now discovered an improved rearview mirror assembly unit in which the mounting support contains a flat surface which is positioned against a prism mirror glass in a central portion thereof, wherein the support contains an actuator element which actuates the prism.

In copending coassigned Ser. No. 439,041, filed Mar. 11, 1965, now U.S. Pat. No. 3,454,692, there is disclosed and claimed a method for making a rearview mirror assemblies in which a glass plate having a bonding agent thereon is brought together under heat and pressure with a mounting bracket to form the mirror of said Ser. No. 252,751.

In copending coassigned application Ser. No. 542,374, filed Apr. 13, 1966, now abandoned, there is disclosed and claimed a method for making a rearview mirror as described above with the addition of backing material enveloping the sides of the glass and extending around the periphery of the glass. The process includes heating a reflective glass plate and holding the plate in the mold with a vacuum while injecting heated thermoplastic material under pressure.

It has been found that with increased injection-molding pressures, the thermoplastic material has sufficient force to move the glass plate and/or break the vacuum and cover the front surface of the glass. In such cases, the product will be unsatisfactory.

It has now been discovered that the process of the aforementioned application Ser. No. 542,374 can be improved by placing against the back of the glass surface a flat surface of a mounting bracket and pressing the same against the reflective mirror plate with such force that the glass is firmly fixed in place and will not move when the thermoplastic material is injected into the mold cavity.

By various aspects of this invention, one or more of the following or other objects can be obtained.

It is an object of this invention to provide an improved rearview mirror assembly.

It is a further object of this invention to provide an improved method for molding a rearview mirror unit in which the backing material envelopes the edges and periphery of the front of the glass whereby slippages of glass in the mold are effectively prevented during the time in which the molten thermoplastic is injected.

It is a still further object of this invention to provide a novel apparatus for producing a rearview mirror unit in which the backing material envelopes the edges and the periphery of the front of the glass plate, in which apparatus slippage of the glass in the mold is effectively prevented during the time in which the molten thermoplastic is injected.

Other aspects, objects, and the several advantages of this invention are apparent to one skilled in the art from a study of this disclosure, the drawings, and the appended claims.

According to the invention, there is provided an improved rearview mirror assembly in which a reflective glass plate has adhesively bonded to the back a solid, flexible, thermoplastic backing body of such composition and thickness that if the glass plate is broken under impact, the backing body will yield and bend, but will not break or tear even at low temperatures. The assembly has a supporting element, preferably an actuator element, with a flat surface positioned firmly against the reflective glass plate which preferably is a prism. The flat surface of the support or actuator element is securely bonded to the reflective glass plate through a layer of thermoplastic material and preferably through a layer of the coating agent on the reflective glass surface. The positioning of the actuator element against the mirror surface will serve to reduce mirror vibration in service.

In another embodiment the above-described mirror is produced by heating a reflective glass plate, placing the same in the mold cavity which is slightly larger than the glass plate, and forcing a thermoplastic coated surface of a support bracket or actuator element firmly against the glass plate in the mold during the injection of heated thermoplastic material under high pressure to effectively prevent sliding of the glass plate during the molding operation. The flat surface of the bracket or actuator element is preferably coated with the same composition as that thermoplastic material which is injected into the mold cavity and forms the backing material for the rearview mirror assembly.

Still further, according to the invention, a novel molding apparatus is provided for the manufacture of the novel rearview mirror assembly. The molding apparatus has a first mold-half, having a platform with a peripheral ditch, the platform serving to support a reflective glass plate and the platform having vacuum ports for holding the glass plate in place. The other side of the mold-half has a mold cavity which forms the back of the mirror assembly. The second mold-half has an aperture extending through the mold-half to the mold cavity and a means in the aperture for holding a bracket or actuator unit in place in the mold cavity spaced from the walls of the mold cavity. The mold-half also has a second aperture for forcing the bracket or actuator element against the glass plate with such force as to effectively prevent shifting of the glass plate within the mold cavity when thermoplastic material is injected into the closed mold cavity under pressure.

The invention will now be described with reference to the accompanying drawings in which.

Figure 1:
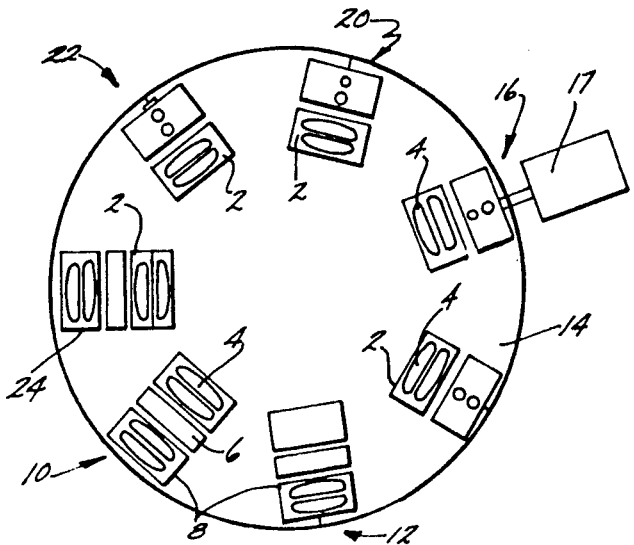
FIG. 1 is a top plan view of a molding apparatus according to the invention which can employ a process according to the invention.

With reference now specifically to FIG. 1, a molding machine has a rotatable turret with a plurality of mold-halves 6 and 8 spaced about the outside of the turret for rotation around the vertical axis thereof. The machine also has a plurality of heating stations 2 onto which a plurality of glass plate mirror elements 4 are placed for heating as the turret rotates from station to station.

At station 10, actuator elements are placed into mold-half 6 and held in place with a holding screw. The turret rotates to move the mold halves to station 12 wherein a heated glass plate mirror element 4 is placed into a bottom mold-half 8. A vacuum source is then actuated beneath the heated mirror element in the mold-half 8 to hold the mirror elements in place. The mold-halves are closed at station 14, and the actuator element in mold-half 6 will be placed against the flat mirror element which is preferably prismatic for a day/night type of mirror. The actuator element is then forced against the mirror element by a special holding means at station 14 to secure the glass plate in place in the bottom mold-half during the molding operation. The mold is then moved to station 16, wherein an injection-molding machine 17 injects molten thermoplastic material into the interior of the mold cavities to integrally form the thermoplastic casing around the mirror element and actuator. The mold-halves are then moved to station 20, wherein the heated thermoplastic material is colled to form the integral mirror assembly. At station 22, the pressure on the actuator element is released, and the holding screw in the actuator element is removed. At station 24, the vacuum is released, the molds are opened, and the finished mirror assemblies are removed.

During the molding operation, the thermoplastic-backing material is integrally bonded to the back of the mirror element to form a safety rearview mirror as disclosed in Ser. No. 252,751.

Figure 2:
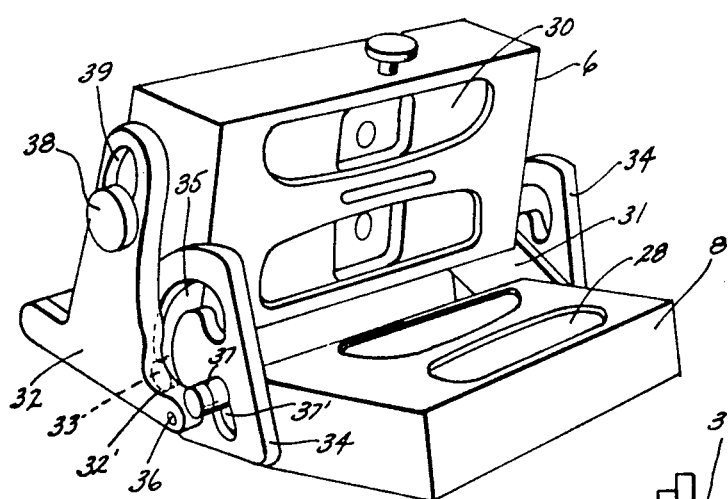
FIG. 2 is a perspective view of a mold used in an apparatus according to the invention as shown in FIG. 1.
Figure 3:
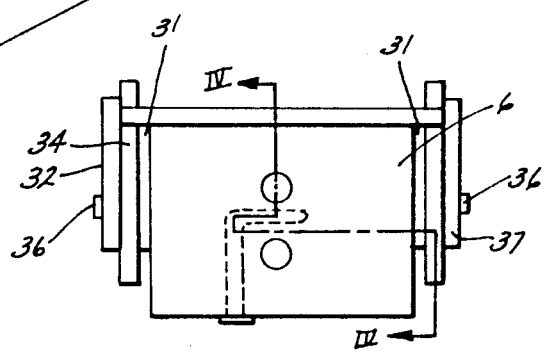
FIG. 3 is a top view of the mold shown in FIG. 2 when the mold is in closed position.

Referring now to FIg. 2, the mold-half 6 contains a cavity 30, which is adapted to receive an actuator element and to provide a cavity in which the thermoplastic-backing layer can form. Mold-half 8 contains a cavity 28 adapted to receive the mirror element. This cavity 28 will be approximately the same shape as the mirror element, except slightly larger with a ditch around the periphery thereof.

The mold-half 6 is supported on rotatable member 32, which is rotatable about pin 36, and attached to mold-half 6 at pin 38 in slot 39. A pin 33 (shown in dotted lines in FIG. 2) is retained in slot 35 in fixed plate 34. The mold half 6 is rotatable about pin 37 which is attached to the mold-half through a plate 31 at the back and outside of mold-half 6 and slides in slot 37'. Pin 37 rides on edge 32' of member 32 when the mold swings open and back.

Figure 4:
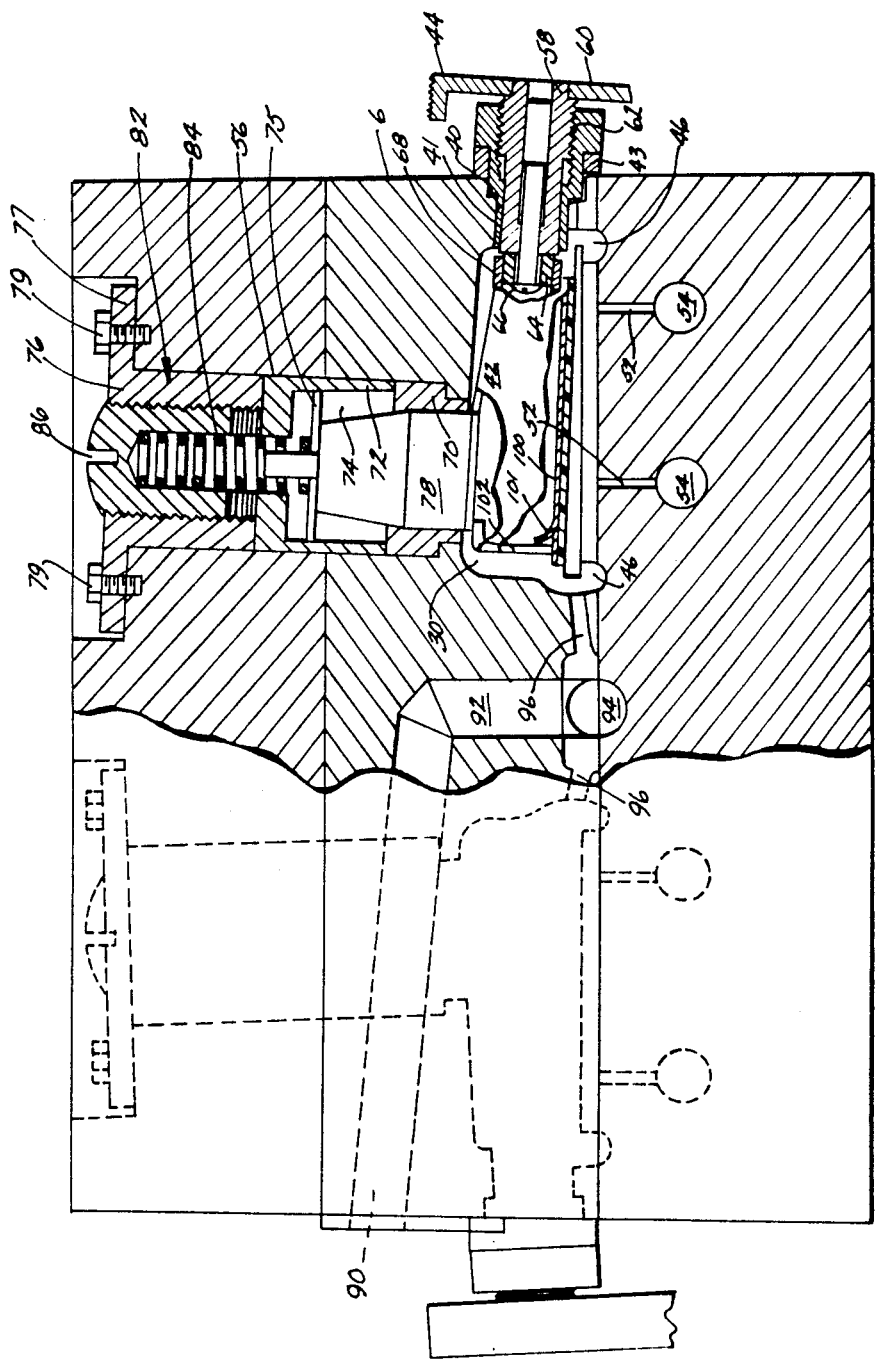
FIG. 4 is a sectional view through lines IV—IV of FIG. 3.

Referring now to FIG. 4, an actuator element 42 having screwplug 78 is placed into mold cavity 30, and is held there by plug 44 which is threadably engaged in a bushing 41 and hole 40 of mold-half 6. Bushing 41 is attached through a retainer 43 to the mold-half. Plug 44 contains a central shaft 58 which threadably engages bushing 41 at 62. The plug has a handle 60 to facilitate the engagement of the plug with the actuator 42. The end of plug 44 contains a cone-shaped hole plug 64 which is attached to shaft 58 through a screw member 66. When the actuator element 42 is placed into the mold cavity 30, the plug 44 is screwed into opening 68 of the actuator to hold the actuator in place. In the final product, the hold 68 serves as an aperture through which the actuator stem can be inserted to change the mirror reflectance surfaces for day or nighttime driving use.

As the actuator element containing screwplug 78 is placed onto the mold cavity 30, it contacts a spring-loaded round disc 75. The screwplug is threadably attached to the actuator element. Thus, the actuator element is positioned first by member 78 and then fastened in place by plug 44.

After the heated mirror element is placed into the mold cavity 28 of mold-half 8, a vacuum means acting through a supply ports 54 and small ports 52 draw a vacuum on the mirror element 4 to hold the same in place. As can be seen from FIG. 4, the mold cavity 28 is shaped similarly to the shape of mirror element 4, except slightly larger, and has a peripheral ditch 46 around the outer portion thereof. The vacuum serves to hold the mirror element 4 in place when the molds are being closed. Thus, by the use of vacuum, sliding of mirror element 4 in the mold cavity is effectively prevented.

After the mold-halves are closed, actuator element 42, which has a thermoplastic coating 134 on the bottom portion thereof, is forced down against the mirror element 4 to securely hold it against platform 48 to prevent it from moving during the molding operation. To this end, screwplug 78 is forced downwardly through the action of spring 84 which acts within the interior chamber of screw 82. An aperture 56 in mold-half 6 is provided for housing the screwplug 78. More specifically, a cavity insert 70 and a retaining device 72 having an inner cylindrical wall 74 are provided for housing the screwplug 78 and are fixed in hole 56 through the action of locking cap 76 abutting against the top portion of insert 72. Screwplug 78 abuts against a round disc 75 at the top portion thereof which slides axially in the cavity formed by walls 74. The locking cap 76 is held in place by screws 79 which attach flange 77 of cap 76 to the mold-half 6.

After the mold-halves are closed, then a screwdriverlike device is placed in slot 86 and rotated to force the screwplug 78 and, in turn, the actuator 42 against the mirror element 4 to securely hold the element in place.

At the molding station, a heated thermoplastic material is introduced into the cavity through ports 90, 92, 94, and 96.

The bottom wall 100 of the actuator element 42 is conventionally attached to walls 102 of the actuator element. A small tab 101 is raised on the inner portion of wall 102. It has been found that this tab 101 prevents collapse of walls 102 inwardly during the extremely high pressures used during the molding operation.

As an example of how the invention works, the injection molding temperature is in the range of 350° to 450° F. and the injection-molding pressure can be in the range of 500 to 5,000 p.s.i. The force which the actuator element exerts against the mirror plate can be in the range of 50 to 150 lbs, preferably between 80 and 110 lbs. The temperature to which the glass plate is heated before it is placed in the mold is in the range of 125° to 200° F., preferably 150° to 180° F. The heating of the glass plate eliminates warpage and breaking of the vacuum when the heated thermoplastic material is injected into the mold.

The vacuum pressure drawn on the mirror element during the molding operation is in the range of 5 to 29 in. of mercury, preferably about 25 in. of mercury.

Figure 5:
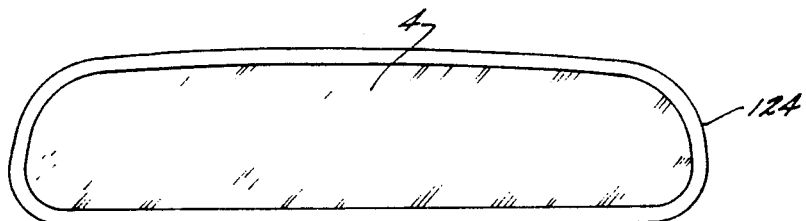
FIG. 5 is a front view of a mirror assembly produced according to the invention.
Figure 6:
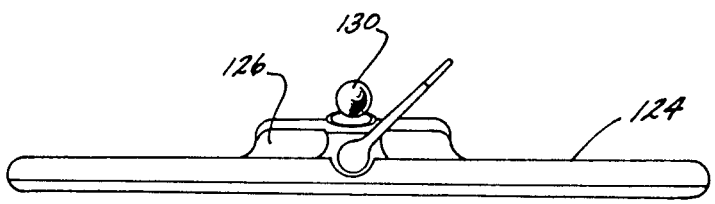
FIG. 6 is a bottom view of the mirror assembly shown in FIG. 5.
Figure 7:
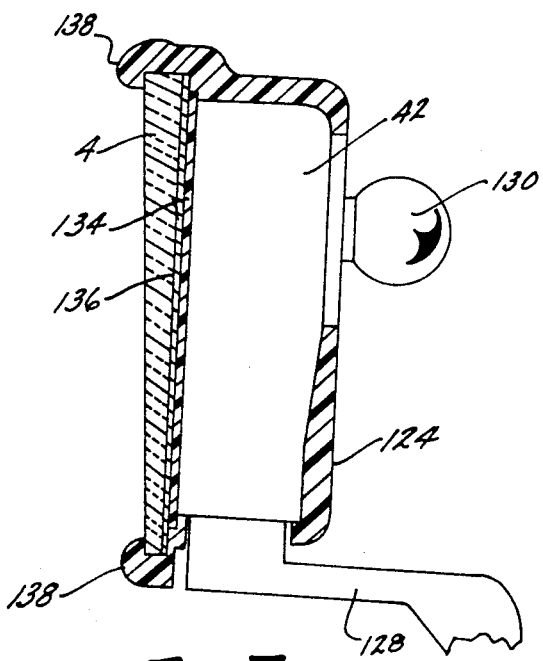
FIG. 7 is a side view, partly in section, of the mirror assembly shown in FIGS. 5 and 6.

The novel mirror assembly produced by the method according to the invention and the apparatus according to the invention is shown in FIGS. 5, 6, and 7.

Referring now specifically to FIGS. 5, 6, and 7, a mirror element 4 which comprises a prism has a thermoplastic-backing layer 124 adhesively bonded to the mirror element through an adhesion-promoting coating 136 on the back of the mirror.

The backing material is preferably made of polyvinyl chloride and is of such composition that in the event the glass plate is broken under impact, the backing layer 124 will yield and bend but will not break or tear, even at low temperatures. The adhesion between the backing material and the glass plate is such that in the event the glass is broken, it will remain intact on the backing layer 124.

The actuator element 42 has an actuator stem 128 which changes the prism-reflecting surface for day or night driving. When the mirror assembly is supported by ball 130, which is threadably engaged by the interior of actuator 42, movement of actuator knob 128 will cause ball 130 to move angularly with respect to the actuator element 42. In this manner, the mirror-reflecting surface is changed with respect to a given point such as a driver in an automobile.

The backing material 124 is adhesively bonded to the mirror plates over a substantial portion of the mirror. As can be seen in FIG. 6, the backing material is raised at 126 to provide for the actuator element. The actuator element has adhesively coated thereto a bonding layer 134 which preferably is the same material as the backing layer. This coating 134 becomes adhesively bonded to the adhesion-promoting layer 136 during the molding operation.

The backing layer extends around and envelopes the edges of the mirror element 4 at 138. However, the backing material is preferably not bonded to the glass at this point.

Many materials can be used for the backing layer 124. These materials include polyethylene, polypropylene, polybutene-1 and copolymers thereof, polymers of vinyl-substituted monomers including polyvinylidene chloride. As has been hereinbefore-mentioned, polyvinyl chloride resins are preferred.

The adhesion promoting layer, which is coated on the back surface of mirror element 4, is a substance which will promote the adhesion of the backing material to the mirror plate. Examples of adhesion promoting materials which can be used include acrylates and polyepoxy resins. A specific example of such a material is an ammonified acrylic material. In the preferred embodiment of the invention, epoxy resins are employed. The thickness of the adhesion-promoting layer is preferably in the range of 0.0002 to 0.002 in. The adhesion promoting substance can be applied to the mirror element by dispersing or dissolving the substance in a liquid, applying the solution to the mirror surface and evaporating the liquid to leave the coating.

The positioning of the actuator 42 firmly against the mirror element 4 serves to provide a rather rigid connection between the assembly support and the mirror element, thereby reducing any vibration of the mirror due to a nonsolid connection between the support and the mirror element. On the other hand, the layer 134 between the actuator element 42 and the mirror 4 protects the mirror surface (under layer 136) from being scratched and damaged by the mirror-actuating element. Thus, the coating layer 134 on the actuator element 42 must be thick enough to protect the mirror element reflective surface from scratching and thin enough so that a firm support can be maintained between the actuator and the prismatic glass plate 4.

The thickness of the thermoplastic layer coated on the actuator element surface which is positioned against the mirror plate, i.e. layer 134, is generally in the range of 0.005 to 0.050 in., preferably in the range of 0.008 to 0.015 in.

Reasonable variation and modification are possible within the scope of the foregoing disclosure, the drawings, and the appended claims without departing from the spirit of the invention.

I CLAIM:
1. A rearview mirror assembly comprising
  A. a day/night prism mirror element,
  B. an adhesion-promoting coating on the back surface of said mirror element,
  C. a solid thermoplastic flexible body forming an integral self-supporting backing material adhesively bonded to said mirror element through said adhesion-promoting coating, the composition and thickness of said thermoplastic body being such that if said mirror element is broken under impact, the backing material will bend, but will not break or tear, even at low temperatures, the glass being so bonded to the backing material that even when fractured, it will remain intact on said backing material; and
  D. a mirror-actuator unit secured within at least a portion of said body and forming a support therefor; said actuator unit having support means adapted to support said mirror assembly on a suitable surface and to be angularly movable with respect to said actuator unit; and said actuator unit having a movable actuator stem emanating therefrom, said stem being adapted to operate, when moved, on said support means to cause said support means to move angularly with respect to said actuator unit so that when said support means is rigidly mounted on a vehicle said mirror is moved from day to night position or vice versa.

2. A rearview mirror assembly according to claim 1, wherein said backing material envelopes the edges of said mirror element.

3. A rearview mirror assembly according to claim 1, wherein said adhesion-promoting layer is an epoxy resin and said thermoplastic material is polyvinyl chloride.

4. A rearview mirror assembly according to claim 1, wherein said actuator unit is a boxlike member embedded completely within said body and the sides of said boxlike member abut against prongs which extend upwardly from said flat surface.

* * * * *